United States Patent
I et al.

(10) Patent No.: US 12,437,435 B2
(45) Date of Patent: Oct. 7, 2025

(54) THREE-DIMENSIONAL MEASUREMENT DEVICE WHICH GENERATES POSITION INFORMATION FOR SURFACE OF OBJECT FROM IMAGE CAPTURED BY MULTIPLE CAMERAS

(71) Applicant: FANUC CORPORATION, Yamanashi (JP)

(72) Inventors: Kouta I, Yamanashi (JP); Junichirou Yoshida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 545 days.

(21) Appl. No.: 17/905,330

(22) PCT Filed: Feb. 26, 2021

(86) PCT No.: PCT/JP2021/007347
§ 371 (c)(1),
(2) Date: Aug. 30, 2022

(87) PCT Pub. No.: WO2021/177163
PCT Pub. Date: Sep. 10, 2021

(65) Prior Publication Data
US 2023/0129785 A1    Apr. 27, 2023

(30) Foreign Application Priority Data

Mar. 5, 2020 (JP) ................................ 2020-038173

(51) Int. Cl.
*G06T 7/70* (2017.01)
*G06V 10/25* (2022.01)
(Continued)

(52) U.S. Cl.
CPC ................ *G06T 7/70* (2017.01); *G06V 10/25* (2022.01); *G06V 10/46* (2022.01); *G06V 10/751* (2022.01); *G06V 10/761* (2022.01)

(58) Field of Classification Search
CPC .... G06V 10/752; G06V 10/25; G06V 10/761; G06V 10/46; G06V 10/751–7515; G06T 7/70–75
See application file for complete search history.

(56) References Cited

U.S. PATENT DOCUMENTS 9,204,128 B2 * 12/2015 Morioka ................ G03B 35/08
9,208,395 B2 * 12/2015 Fujiki .................. G06V 10/255
(Continued)

FOREIGN PATENT DOCUMENTS

CN    106548173 A  *  3/2017  ............ G01C 21/20
CN    110473244 A    11/2019
(Continued)

OTHER PUBLICATIONS

M. Servais, T. Vlachos and T. Davies, "Motion-compensation using variable-size block-matching with binary partition trees," IEEE International Conference on Image Processing 2005, Genova, Italy, 2005, pp. I-157, doi: 10.1109/ICIP.2005.1529711 (Year: 2005).*

*Primary Examiner* — Vu Le
*Assistant Examiner* — Jack Peter Kraynak
(74) *Attorney, Agent, or Firm* — HAUPTMAN HAM, LLP

(57) ABSTRACT

A control device includes a processing unit for processing a first image captured by a first camera and a second image captured by a second camera. The processing unit performs control using block matching. A first determination value on a block matching score and a second determination value greater than the first determination value are determined in advance. The processing unit generates a first distance image using the first determination value and a second distance (Continued)

image using the second determination value. The processing unit adopts distance information for a pixel contained in the first distance image for a region corresponding to the contour of a workpiece and distance information for a pixel contained in the second distance image for a region other than the region corresponding to the contour to generate a synthesized distance image.

3 Claims, 19 Drawing Sheets

(51) Int. Cl.
*G06V 10/46* (2022.01)
*G06V 10/74* (2022.01)
*G06V 10/75* (2022.01)

(56) References Cited

U.S. PATENT DOCUMENTS

| | | | | |
|---|---|---|---|---|
| 11,803,982 | B2* | 10/2023 | Matsumoto | G06T 5/50 |
| 2012/0262594 | A1* | 10/2012 | Koizumi | H04N 23/45 |
| | | | | 348/E5.024 |
| 2015/0116315 | A1* | 4/2015 | Takemoto | G06T 7/564 |
| | | | | 345/419 |
| 2016/0125590 | A1* | 5/2016 | Yoshida | H01L 22/12 |
| | | | | 348/87 |
| 2019/0230281 | A1* | 7/2019 | Ohba | G06T 7/70 |
| 2022/0012905 | A1* | 1/2022 | Matsumoto | G06T 7/521 |

FOREIGN PATENT DOCUMENTS

| | | | | |
|---|---|---|---|---|
| EP | 3001141 A1 * | 3/2016 | | G01B 11/24 |
| EP | 3327624 A1 * | 5/2018 | | G06K 9/00805 |
| JP | H829126 A | 2/1996 | | |
| JP | 200182927 A | 3/2001 | | |
| JP | 2001082927 A * | 3/2001 | | |
| JP | 2009293971 A * | 12/2009 | | |
| JP | 2012198712 A * | 10/2012 | | |
| JP | 201569566 A | 4/2015 | | |

* cited by examiner

THREE-DIMENSIONAL MEASUREMENT DEVICE WHICH GENERATES POSITION INFORMATION FOR SURFACE OF OBJECT FROM IMAGE CAPTURED BY MULTIPLE CAMERAS

RELATED APPLICATIONS

The present application is a National Phase of International Application No. PCT/JP2021/007347 filed Feb. 26, 2021, which claims priority to Japanese Application No. 2020-038173, filed Mar. 5, 2020.

TECHNICAL FIELD

The present invention relates to a three-dimensional measurement device that generates position information of a surface of an object based on images captured by a plurality of cameras.

BACKGROUND ART

In the related art, a three-dimensional measurement device that captures an image by a vision sensor and detects position information of a surface of an object based on the obtained image is known. As the vision sensor that detects a three-dimensional position, a stereo camera including two two-dimensional cameras is known. In processing of the image captured by the stereo camera, a distance from the stereo camera to the object is calculated based on parallax between positions of the object in an image captured by one camera and an image captured by the other camera. In addition, three-dimensional positions of points of measurement set on the surface of the object can be calculated based on the distance to the object and the positions of the two cameras.

In processing of the image of the stereo camera, it is necessary to detect the position of the object included in the image captured by the other camera so as to correspond to the position of the object included in the image captured by one camera. For this purpose, a control in which a block having a predetermined size is set in one image and a position in another image corresponding to this block is searched is known (e.g., Japanese Unexamined Patent Publication No. 2001-82927 A). Since the search is performed on each block, such a method is referred to as a block matching.

CITATION LIST

Patent Literature

[PTL 1] Japanese Unexamined Patent Publication No. 2001-82927 A

SUMMARY OF INVENTION

Technical Problem

When the block matching is performed in the processing of the image of the stereo camera, a first image is captured by one camera, and a second image is captured by the other camera. Whether a block selected in the first image corresponds to a block selected in the second image is determined. The blocks include a plurality of pixels. When the block corresponding to the block in the first image is present in the second image, parallax of the pixels included in the blocks is calculated.

In a control that calculates position information of a surface, such as a distance image, by using block matching, there may be a case where accurately measuring contours, such as a small step difference of an object, a slight gap between objects, and a fine shape of an object, is difficult. For example, when the distance image is generated by the stereo camera, for example, a small step difference of an object or a gap between objects disappears in some cases. Alternatively, there is a case where accurate distance information cannot be obtained in, for example, a small step difference of an object or a gap between objects. In this way, the stereo camera had a problem in that accurately acquiring the position information of the surface of the object was difficult at a portion where a change in shape in the image was fine.

Solution to Problem

A three-dimensional measurement device of a first aspect of the present disclosure includes a vision sensor that includes a first camera configured to capture a first image and a second camera configured to capture a second image and a contour detection sensor configured to detect a contour of an object. The three-dimensional measurement device includes a processing unit configured to detect position information of a surface of the object based on the first image and the second image. The processing unit includes a contour detection unit configured to detect the contour of the object based on an output from the contour detection sensor. The processing unit includes a block search unit configured to set a selection block formed of a plurality of pixels including one selection pixel selected in the first image, the block search unit being configured to search for a specific block corresponding to the selection block in the second image. The processing unit includes a calculation unit configured to calculate distance information of a pixel based on parallax between a position of the selection pixel in the selection block and a position of a specific pixel corresponding to the selection pixel in the specific block. The processing unit includes a generation unit configured to generate the position information of the surface of the object including the distance information of a plurality of the pixels. The processing unit includes a synthesis unit configured to synthesize the position information of the surface of the object generated under conditions different from one another. The block search unit is configured to calculate an integrated value by integrating magnitudes of differences between values of pixels included in the selection block and values of pixels included in the specific block or square values of the differences. The block search unit is configured to determine that the pixel included in the specific block corresponds to the pixel included in the selection block when the integrated value is less than a predetermined determination value. The block search unit is configured to set information indicating an invalid pixel as distance information of the selection pixel when the integrated value exceeds the predetermined determination value or the specific block corresponding to the selection block is not detected. A first determination value regarding the integrated value and a second determination value regarding the integrated value larger than the first determination value are predetermined. The block search unit, the calculation unit, and the generation unit are configured to generate first position information of the surface by using the first image, the second image, and the first determination value, and second position information of the surface by using the first image, the second image, and the second determination value. The synthesis unit is configured to set a region corresponding to the contour based on the contour detected by the contour detection unit, employ distance information of a pixel included in the first position information of the surface for a pixel included in the region corresponding to the contour, employ distance information of a pixel included in the second position information of the surface for a pixel included in a region other than the region corresponding to the contour, and thereby generate position information of a surface obtained by synthesizing the first position information of the surface and the second position information of the surface.

A three-dimensional measurement device of a second aspect of the present disclosure includes a vision sensor that includes a first camera configured to capture a first image and a second camera configured to capture a second image and a contour detection sensor configured to detect a contour of an object. The three-dimensional measurement device includes a processing unit configured to detect position information of a surface of the object based on the first image and the second image. The processing unit includes a contour detection unit configured to detect the contour of the object based on an output from the contour detection sensor. The processing unit includes a block search unit configured to set a selection block formed of a plurality of pixels including one selection pixel selected in the first image, the block search unit being configured to search for a specific block corresponding to the selection block in the second image. The processing unit includes a calculation unit configured to generate distance information of a pixel based on parallax between a position of the selection pixel in the selection block and a position of a specific pixel corresponding to the selection pixel in the specific block. The processing unit includes a generation unit configured to generate the position information of the surface of the object including the distance information of a plurality of the pixels. The processing unit includes a synthesis unit configured to synthesize the position information of the surface of the object generated under conditions different from one another. A first selection block and a second selection block including pixels more than pixels of the first selection block are predetermined. The block search unit, the calculation unit, and the generation unit are configured to generate first position information of the surface by using the first image, the second image, and the first selection block, and second position information of the surface by using the first image, the second image, and the second selection block. The synthesis unit is configured to set a region corresponding to the contour based on the contour detected by the contour detection unit, set distance information of a pixel included in the first position information of the surface for a pixel included in the region corresponding to the contour, set distance information of a pixel included in the second position information of the surface for a pixel included in a region other than the region corresponding to the contour, and thereby generate position information of a surface obtained by synthesizing the first position information of the surface and the second position information of the surface.

Advantageous Effects of Invention

According to the aspects of the present disclosure, a three-dimensional measurement device that improves accuracy of position information of a surface of an object can be provided.

DESCRIPTION OF EMBODIMENTS

A three-dimensional measurement device in an embodiment will be described with reference to FIG. 1 to FIG. 19. The three-dimensional measurement device according to the present embodiment includes a vision sensor that includes a first camera for capturing a first image and a second camera for capturing a second image. The three-dimensional measurement device generates position information of a surface of an object based on the first image and the second image. In particular, the position information including information of a three-dimensional point of measurement set to the surface of the object is generated.

Figure 1:
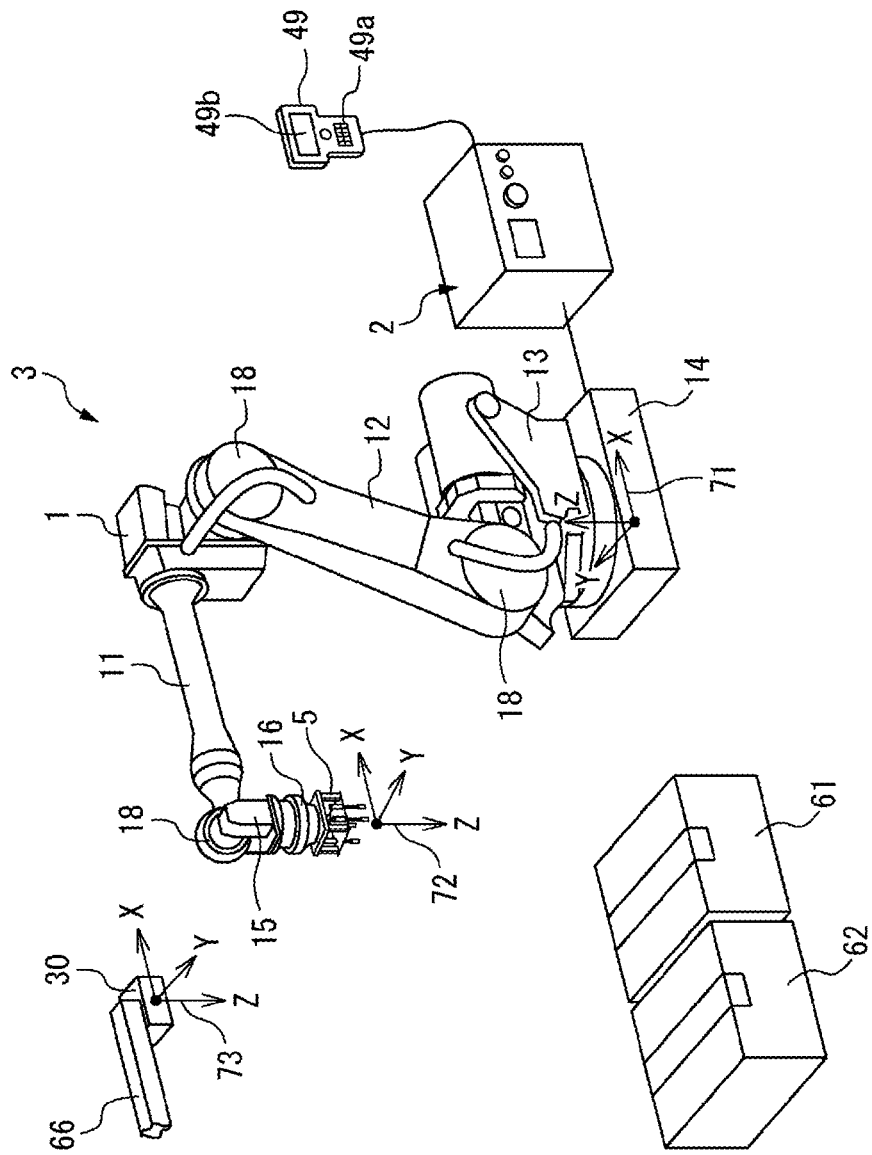
FIG. 1 is a perspective view of a robot apparatus in an embodiment.
Figure 2:
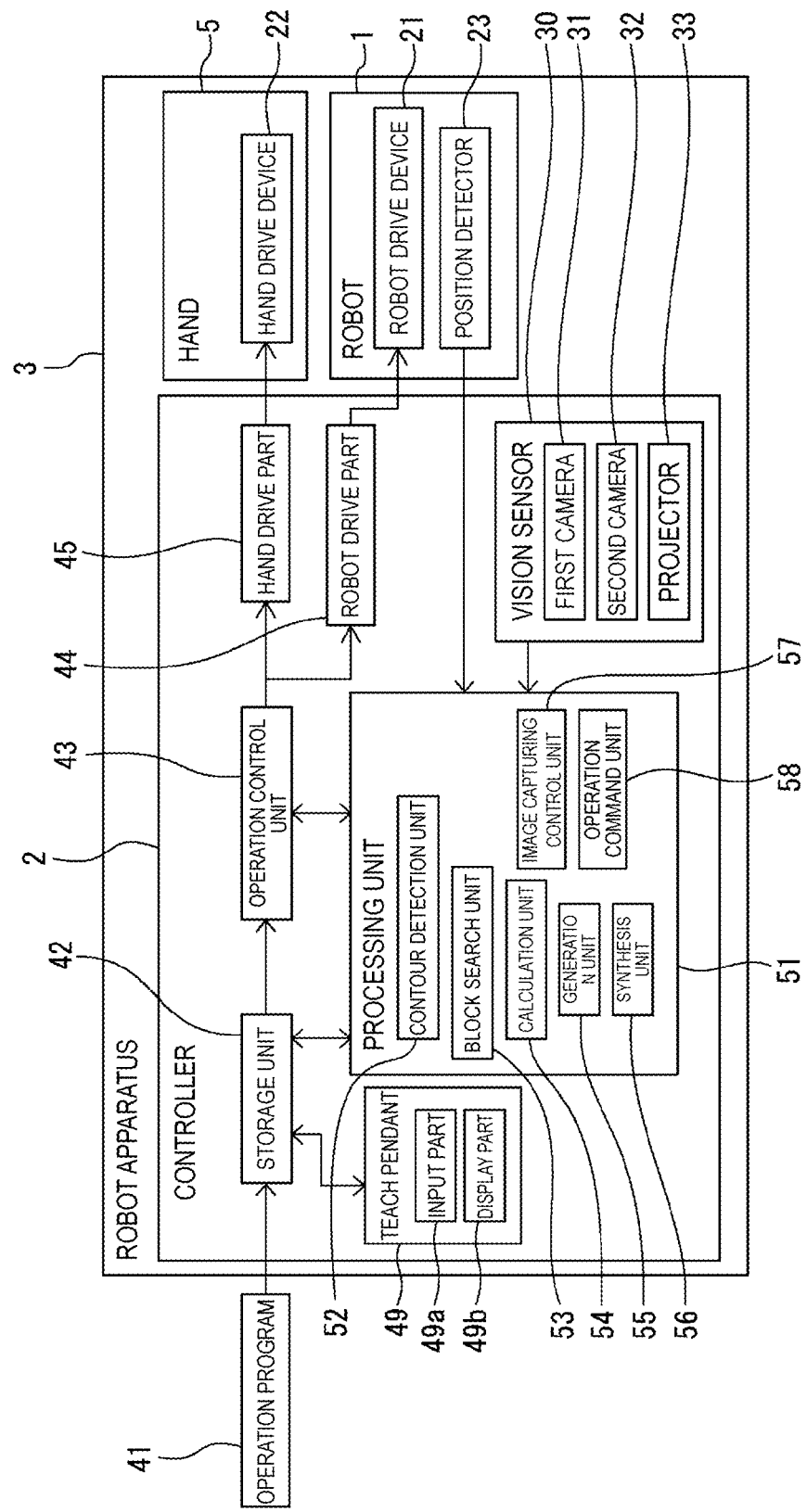
FIG. 2 is a block diagram of the robot apparatus.

FIG. 1 is a perspective view of a robot apparatus in the present embodiment. FIG. 2 is a block diagram of the robot apparatus of the present embodiment. With reference to FIG. 1 and FIG. 2, a robot apparatus 3 includes a hand 5 that grasps workpiece 61, 62 and a robot 1 that moves the hand 5. The robot apparatus 3 includes a controller 2 that controls the robot apparatus 3. The robot apparatus 3 includes a vision sensor 30 for generating the position information of the three-dimensional point of measurement corresponding to the surfaces of the workpieces 61, 62 as the objects.

The workpieces 61, 62 of the present embodiment are corrugated cardboard boxes having rectangular parallelepiped shapes. The hand 5 is an end effector that grasps and releases the workpiece 61, 62. The hand 5 of the present embodiment is a suction hand that grasps the surface of the workpiece 61, 62 by suction. The end effector attached on the robot 1 is not limited to this configuration. Any operation tool can be employed according to an operation performed by the robot apparatus 3. For example, as the end effector, an operation tool that performs welding or an operation tool that applies a seal material over the surface of the workpiece can be employed. That is, the three-dimensional measurement device of the present embodiment can be applied to a robot apparatus that performs any operation.

The robot 1 of the present embodiment is an articulated robot having a plurality of joints 18. The robot 1 includes an upper arm 11 and a lower arm 12. The lower arm 12 is supported by a turning base 13. The turning base 13 is supported by a base 14. The robot 1 includes a wrist 15 that is coupled to an end portion of the upper arm 11. The wrist 15 includes a flange 16 that fixes the hand 5. A constituent member of the robot 1 is formed so as to rotate about a predetermined drive axis. The robot is not limited to the configuration. Any robot that can move the operation tool can be employed.

Figure 3:
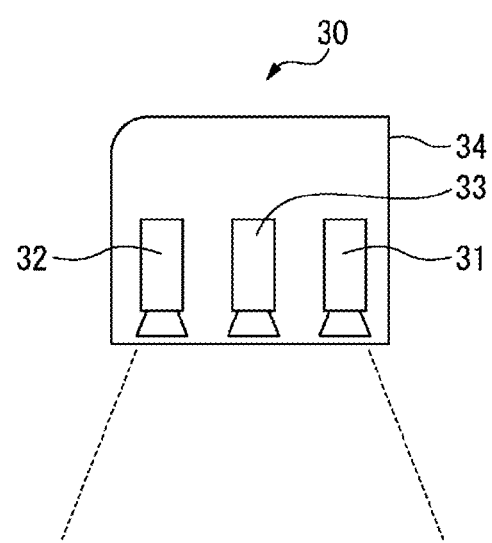
FIG. 3 is a schematic diagram of a vision sensor in the embodiment.

FIG. 3 illustrates a schematic diagram of a camera in the present embodiment. The vision sensor 30 of the present embodiment is a stereo camera including a first camera 31 and a second camera 32. The cameras 31, 32 are two-dimensional cameras that can capture two-dimensional images. As the camera 31, 32, any camera including an image sensor, such as a Charge-Coupled Device (CCD) sensor or a Complementary Metal-Oxide Semiconductor (CMOS) sensor, can be employed. The two cameras 31, 32 are disposed away from one another. The relative positions of the two cameras 31, 32 are determined in advance. The two cameras 31, 32 of the present embodiment are disposed such that optical axes of the respective cameras 31, 32 are parallel to one another. The vision sensor 30 of the present embodiment includes a projector 33 that projects light in a pattern, such as a stripe pattern, to the workpieces 61, 62. The cameras 31, 32 and the projector 33 are disposed inside a housing 34.

With reference to FIG. 1 and FIG. 2, the vision sensor 30 is supported by a support member 66. The position of the vision sensor 30 of the present embodiment is fixed. The vision sensor 30 is disposed at a position where the vision sensor 30 can capture the images of the workpieces 61, 62.

The three-dimensional measurement device processes the images acquired by the vision sensor 30. Thus, the three-dimensional measurement device can generate the position information of the surface of the object in a form of a distance image or a three-dimensional map. The distance image represents the position information of the surface of the object using an image. The distance image represents the position of the surface of the object or the distance from the vision sensor 30 by depth or color of each pixel. On the other hand, the three-dimensional map represents the position information of the surface of the object by a set of coordinate values (x, y, z) at the point of measurement of the surface of the object corresponding to the pixel. In the configuration of the present embodiment, the position information of the surface of the object will be described by using the distance image as an example.

The robot 1 of the present embodiment includes a robot drive device 21 that drives constituent members, such as the upper arm 11. The robot drive device 21 includes a plurality of drive motors for driving the upper arm 11, the lower arm 12, the turning base 13, and the wrist 15. The hand 5 includes a hand drive device 22 that drives the hand 5. The hand drive device 22 of the present embodiment drives the hand 5 by air pressure. The hand drive device 22 includes, for example, a pump and an electromagnetic valve for decompressing an interior space of a suction pad.

The controller 2 controls the robot 1 and the hand 5. The controller 2 has an arithmetic processing device (computer) which includes a CPU (Central Processing Unit) as a processor. The arithmetic processing device has a RAM (Random Access Memory), a ROM (Read Only Memory), or the like, which are mutually connected to the CPU via a bus. The robot apparatus 3 of the present embodiment automatically conveys the workpieces 61, 62 based on an operation program 41. The robot drive device 21 and the hand drive device 22 are controlled by the controller 2.

The controller 2 includes a storage unit 42 for storing information relating to the control of the robot apparatus 3. The storage unit 42 can be configured of a storage medium capable of storing information, for example, a volatile memory, a non-volatile memory, a hard disk, or the like. The operation program 41 generated in advance for operating the robot 1 is input to the controller 2. The operation program 41 is stored in the storage unit 42.

The controller 2 includes an operation control unit 43 for transmitting an operation command. The operation control unit 43 transmits an operation command for driving the robot 1 to a robot drive part 44 based on the operation program 41. The robot drive part 44 includes an electric circuit that drives the drive motors. The robot drive part 44 supplies electricity to the robot drive device 21 based on the operation command. The operation control unit 43 transmits an operation command for driving the hand drive device 22 to a hand drive part 45. The hand drive part 45 includes an electric circuit that drives, for example, a pump. The hand drive part 45 supplies electricity to, for example, the pump based on the operation command.

The operation control unit 43 corresponds to a processor that is driven in accordance with the operation program 41. The processor reads the operation program 41 and functions as the operation control unit 43 by performing the control that is defined in the operation program 41.

The robot 1 includes a state detector for detecting a position and an orientation of the robot 1. The state detector of the present embodiment includes a position detector 23 attached to each drive shaft of the drive motors in the robot drive device 21. By the output from the position detector 23, a position and an orientation of the robot 1 are detected. The state detector is not limited to the position detector attached to the drive motor, and any detector that allows detecting the position and the orientation of the robot 1 can be employed.

The controller 2 includes a teach pendant 49 as an operation panel for manually operating the robot apparatus 3 by an operator. The teach pendant 49 includes an input part 49*a* for inputting information on the robot 1, the hand 5, and the vision sensor 30. The input part 49*a* is configured with a member, such as a keyboard and a dial. The teach pendant 49 includes a display part 49*b* that displays information on the control of the robot apparatus 3. The display part 49b is configured with a display panel, such as a liquid crystal display panel.

A world coordinate system 71 that is immovable when the position and the orientation of the robot 1 change is set to the robot apparatus 3 of the present embodiment. In the example illustrated in FIG. 1, an origin of the world coordinate system 71 is disposed at the base 14 of the robot 1. The world coordinate system 71 is also referred to as a reference coordinate system. In the world coordinate system 71, the position of the origin is fixed, and further, the directions of the coordinate axes are fixed. Even when the position and the orientation of the robot 1 change, the position and the orientation of the world coordinate system 71 do not change.

Additionally, in the robot apparatus 3, a tool coordinate system 72 having an origin set at any position of the operation tool is set. The position and the orientation of the tool coordinate system 72 change together with the hand 5. The origin of the tool coordinate system 72 according to the present embodiment is set at a tool tip point. Furthermore, in the robot apparatus 3, a camera coordinate system 73 is set to the vision sensor 30. The camera coordinate system 73 is a coordinate system in which an origin is fixed at the vision sensor 30.

When the position and the orientation of the robot 1 change, the position of the origin and the orientation of the tool coordinate system 72 change. For example, the position of the robot 1 corresponds to a position of the tool tip point (the position of the origin of the tool coordinate system 72). Furthermore, the orientation of the robot 1 corresponds to the orientation of the tool coordinate system 72 with respect to the world coordinate system 71.

The robot apparatus 3 of the present embodiment includes a three-dimensional measurement device for detecting the workpieces 61, 62. In the present embodiment, the controller 2 functions as the three-dimensional measurement device. The three-dimensional measurement device includes the vision sensor 30, a contour detection sensor for detecting the contours of the workpieces 61, 62, and a processing unit 51 for detecting the position information of the surfaces of the workpieces 61, 62 based on the first image captured by the first camera 31 and the second image captured by the second camera 32.

As the contour detection sensor, any sensor that can detect a contour, such as a step difference portion, a recess, a protrusion, and an outer edge of an object, in a two-dimensional image can be employed. In the present embodiment, the first camera 31 of the vision sensor 30 functions as the contour detection sensor. The contours of the surfaces of the workpieces 61, 62 are detected based on the two-dimensional first image captured by the first camera 31. This configuration eliminates the need for disposing a contour detection sensor in addition to the vision sensor 30, and the configuration of the three-dimensional measurement device can be simplified. Note that the second camera 32 may be used as the contour detection sensor. Alternatively, for example, a two-dimensional camera other than the vision sensor 30 may be disposed in the robot apparatus as the contour detection sensor.

The processing unit 51 includes a contour detection unit 52 for detecting the contour of the object based on the output from the contour detection sensor. The processing unit 51 includes a block search unit 53 that sets a selection block configured by a plurality of pixels in the first image, and searches for a specific block corresponding to the selection block in the second image. The processing unit 51 includes a calculation unit 54 that calculates distance information of the pixel based on parallax between the position of the selection pixel in the selection block and a position of a specific pixel corresponding to the selection pixel in the specific block. The processing unit 51 includes a generation unit 55 that generates the position information of the surface of the object including the distance information of the plurality of pixels. The processing unit 51 includes a synthesis unit 56 that synthesizes the position information of the surface of the object generated under conditions different from one another.

The processing unit 51 includes an image capturing control unit 57 that transmits a command for capturing an image to the vision sensor 30. The processing unit 51 includes an operation command unit 58 that generates the operation command for driving the robot 1 based on the position information of the surface of the object after the synthesis.

The processing unit 51 described above is equivalent to the processor that is driven in accordance with the operation program 41. Especially, each unit of the contour detection unit 52, the block search unit 53, the calculation unit 54, the generation unit 55, and the synthesis unit 56 is equivalent to the processor that is driven in accordance with the operation program 41. The image capturing control unit 57 and the operation command unit 58 are equivalent to the processors that are driven in accordance with the operation program 41. The processor functions as each unit by reading the operation program 41 and performing the control that is defined by the operation program 41.

The robot apparatus 3 of the present embodiment generates the distance image of the workpiece 61, 62 based on the output from the vision sensor 30 before the hand 5 grasps the workpiece 61, 62. The image capturing control unit 57 transmits a command for capturing an image to the vision sensor 30. The processing unit 51 generates the position information of the surface of the workpiece 61, 62 based on the images captured by the first camera 31 and the second camera 32 of the vision sensor 30. The position information of the surface is, for example, generated at the camera coordinate system 73. The processing unit 51 can convert the position information of the surface represented at the camera coordinate system 73 into the position information of the surface represented at the world coordinate system 71 based on the position and the orientation of the camera coordinate system 73 with respect to the world coordinate system 71.

The operation command unit 58 in the processing unit 51 detects the shape and the position of the surface of the workpiece 61 based on the position information of the surface of the workpiece 61. The operation command unit 58 transmits the operation command of the robot 1 to the operation control unit 43 such that the hand 5 can grasp the surface of the workpiece 61. The operation control unit 43 changes the position and the orientation of the robot 1 based on the operation command and then grasps the workpiece 61 by the hand 5. The robot 1 conveys the workpiece 61 to a target position based on the operation program 41. Next, the robot apparatus 3 conveys the workpiece 62 after grasping the workpiece 62 based on the position information of the surface of the workpiece 62. In this manner, the robot apparatus 3 can detect the positions of the workpieces 61, 62 and convey the workpieces 61, 62.

Next, a control for generating the distance image by the three-dimensional measurement device of the present embodiment will be described. The three-dimensional measurement device of the present embodiment generates the distance images under a plurality of conditions different from one another, and generates a synthetic distance image obtained by combining a plurality of the distance images.

Figure 4:
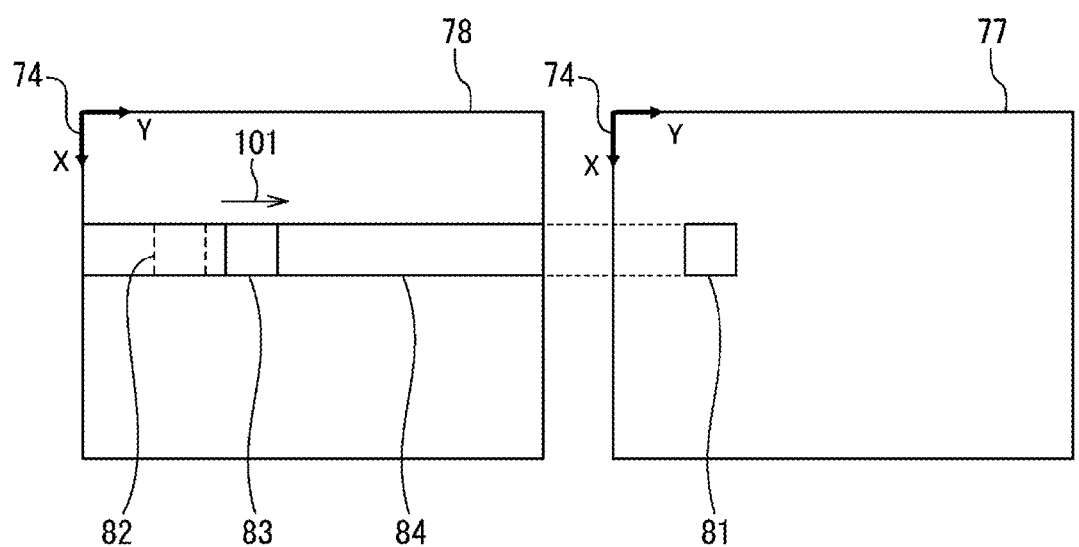
FIG. 4 is a diagram of a selection block in a first image and a search region and a search block in a second image.

FIG. 4 illustrates the first image captured by the first camera and the second image captured by the second camera. The vision sensor 30 captures a first image 77 by the first camera 31. The vision sensor 30 captures a second image 78 by the second camera 32. The first image 77 and the second image 78 are two-dimensional images. Each of the images 77 and 78 is formed of a plurality of pixels. In each of the images 77 and 78, a screen coordinate system 74 having a predetermined point in the image as an origin is set. The position in the image represented at the screen coordinate system 74 corresponds to the position in the image sensor disposed inside of each of the cameras 31, 32.

Figure 5:
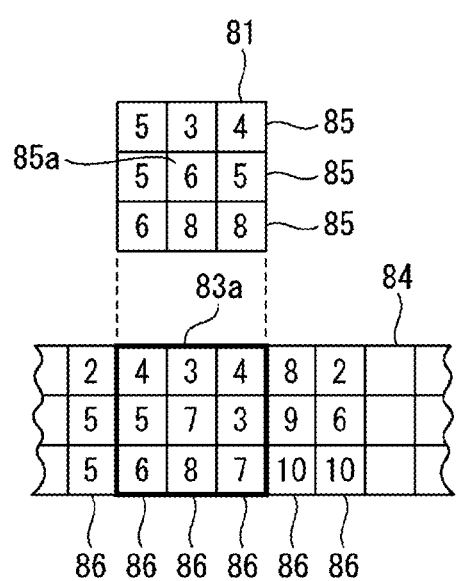
FIG. 5 is a diagram of the selection block and the search region that describes a first step of a control for searching a specific block corresponding to the selection block.

FIG. 5 illustrates a diagram of the selection block and the search block that describes a first step when block matching is performed. FIG. 5 illustrates an enlarged view of a selection block 81 set in the first image 77 and a search region 84 set in the second image 78. With reference to FIG. 2, FIG. 4, and FIG. 5, the block search unit 53 in the processing unit 51 selects one pixel as a selection pixel 85a among pixels 85 included in the first image 77. The block search unit 53 sets the selection block 81 including the selection pixel 85a and the pixels 85 around the selection pixel 85a.

In the selection block 81 in the present embodiment, the plurality of pixels 85 are set so as to surround the selection pixel 85a. In the selection block 81 illustrated in FIG. 5, the three pixels 85 are selected in the horizontal direction of the first image 77 (the Y-axis direction of the screen coordinate system 74), and the three pixels 85 are selected in the vertical direction. The block size as the size of the selection block 81 is not limited to this configuration, and any number of pixels can be included. In addition, in the present embodiment, the selection pixel 85a is disposed at the center of the selection block 81, but the embodiment is not limited to this, and the selection pixel 85a can be disposed at any position in the selection block 81.

The block search unit 53 controls the block matching that searches for a specific block 82 corresponding to the selection block 81 in the second image 78. A value of the pixel obtained by quantifying, for example, a density, a luminance, or color information is set to each of the pixels 85. The block search unit 53 searches for the block in which the values of these pixels correspond well from the second image 78. Then, the block search unit 53 sets this block as the specific block 82.

The block search unit 53 sets the search region 84 in the second image 78 in order to detect the specific block 82 corresponding to the selection block 81. As the search region 84, a region passing through the same position as the selection block 81 and parallel to an epipolar line can be set, for example. The height of the search region 84 can be the same as the height of the selection block 81. In the present embodiment, in the second image 78, the search region 84 is set so as to extend in the Y-axis direction of the screen coordinate system 74. The block search unit 53 selects a search block 83 in the search region 84. The shape and the size of the search block 83 can be set so as to be the same as the size and shape of the selection block 81.

In the example illustrated in FIG. 5, a search block 83a is set in the search region 84. The block search unit 53 in the present embodiment performs block matching by sum of absolute difference (SAD) method. The block search unit 53 calculates a score SC1 based on values of pixels 86 included in the search block 83a and the values of the pixels 85 included in the selection block 81. The score is an integrated value obtained by integrating magnitudes of differences in the values of the pixels corresponding to one another in the respective blocks 81, 83a. This score is also referred to as a matching score. In the example illustrated in FIG. 5, the score SC1 is calculated by the following equation (1).

$$SC1 = |5-4|+|3-3|+|4-4|+|5-5|+|6-7|+|5-3|+|6-6|+|8-8|+|8-7|=5. \quad (1)$$

Next, as indicated by an arrow 101, the block search unit 53 moves the position of the search block 83 along the search region 84. In the present embodiment, the search block 83 is shifted by the distance of the width of one pixel 86. The distance of moving the search block 83 is not limited to this, and may be a distance of a width of two or more pixels.

Figure 6:
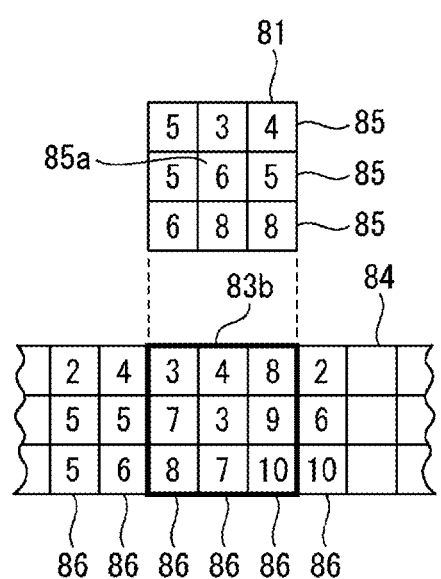
FIG. 6 is a diagram of the selection block and the search region that describes a second step of the control for searching the specific block corresponding to the selection block.

FIG. 6 illustrates a diagram of the selection block and the search block that describes a second step when block matching is performed. With reference to FIG. 5 and FIG. 6, a search block 83b is set by shifting the search block 83 by the block search unit 53. The block search unit 53 calculates a score SC2 based on the values of the pixels 85 included in the selection block 81 and the values of the pixels 86 included in the search block 83b. In the example illustrated in FIG. 6, the score SC2 is calculated by the following equation (2).

$$SC2 = |5-3|+|3-4|+|4-8|+|5-7|+|6-3|+|5-9|+|6-8|+|8-7|+|8-10|=21. \quad (2)$$

In this manner, the block search unit 53 calculates the score while shifting the position of the search block 83 along the search region 84. The block search unit 53 moves the search block 83 from one end to the other end of the search region 84. The block search unit 53 calculates the score at each of the positions of the search block 83 while slightly shifting the position of the search block 83. In the present embodiment, it is determined that the smaller the score is, the better the search block 83 corresponds to the selection block 81. In the example described above, it is determined that the search block 83a illustrated in FIG. 5 corresponds to the selection block 81 better than the search block 83b illustrated in FIG. 6.

The block search unit 53 sets the search block 83 at the position having the lowest score as the specific block 82 corresponding to the selection block 81 among the respective positions in the search block 83. In this way, the block search unit 53 can set the search block 83 having a value close to that of the pixel 85 included in the selection block 81 as the specific block 82.

Note that the block search unit may calculate an integrated value by integrating square values of differences between the values of the pixels included in the selection block and the values of the pixels included in the search block as the score. This method is referred to as a sum of squared difference (SSD) method. In this method as well, it can be determined that the smaller the score value is, the better the two blocks correspond.

In this way, the block search unit 53 performs the block matching, and thus ensuring searching for the specific block 82 that best corresponds to the selection block 81. Next, the block search unit 53 compares the score calculated by using the selection block 81 and the specific block 82 with a predetermined determination value. In the present embodiment, the determination value for the score is predetermined. When the score is less than the determination value, the block search unit 53 determines that the pixel 86 included in the specific block 82 corresponds to the pixel 85 included in the selection block 81. The block search unit 53 selects the specific pixel corresponding to the selection pixel 85a in the specific block 82. When the search block 83a illustrated in FIG. 5 is set as the specific block 82, the pixel disposed at the center of the search block 83a becomes the specific pixel.

On the other hand, when the score is at the determination value or more, the block search unit 53 determines that the specific block 82 does not sufficiently correspond to the selection block 81. The block search unit 53 sets information indicating an invalid pixel as the distance information of the selection pixel 85a. The invalid pixel is a pixel that does not include information, such as a concrete distance and a concrete position of a point of measurement. Additionally, when the specific block corresponding to the selection block is not detected, the block search unit 53 sets information indicating the invalid pixel as the distance information of the selection pixel.

The block search unit 53 can select all pixels included in the first image 77 as the selection pixels, and perform the control similar to the control described above. The specific block 82 and the specific pixel are set with respect to the pixels 85 included in the first image 77. Alternatively, the pixel 85 is set as the invalid pixel. Note that the block search unit 53 may perform the control similar to the control described above on the pixels disposed in the predetermined region of the first image 77.

Next, the calculation unit 54 calculates the parallax between the position of the selection pixel 85a in the selection block 81 and the position of the specific pixel in the specific block 82. The calculation unit 54 calculates the distance from the vision sensor 30 to the surface of the object based on this parallax. In particular, the calculation unit 54 calculates the distances to the points of measurement on the surface of the object corresponding to the selection pixel 85a and the specific pixel. The calculation unit 54 may calculate the position of the point of measurement on the surface of the object based on the calculated distance. The position of the point of measurement can be calculated at the camera coordinate system 73.

The calculation unit 54 sets the distance information of the pixel for each of the pixels 85 in the first image 77. The distance information of the pixel is, for example, the distance from the vision sensor 30 to the point of measurement or information of the position of the point of measurement. Further, as described above, the distance information of the pixel includes the information indicating the invalid pixel. Note that since the distance information of the pixel is the information on the position of the point of measurement, the distance information is equivalent to the distance information of the point of measurement.

The generation unit 55 generates the position information of the surface of the object including the distance information of the plurality of pixels by using the distance information of the respective pixels. In the example here, the generation unit 55 sets the density of color of the pixel according to the distance from the vision sensor 30 to the object. The distance image can be generated by setting the image having the density according to the distance to each pixel.

Figure 7:
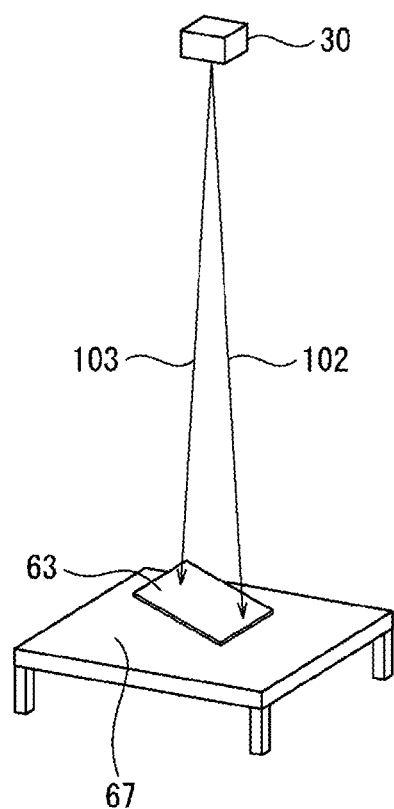
FIG. 7 is a perspective view of the vision sensor and a workpiece that describes an example of capturing the workpiece by the vision sensor.

FIG. 7 illustrates a perspective view of the vision sensor and a workpiece that describes an example of the distance image. In this example, a workpiece 63 is disposed on a surface of a platform 67. The workpiece 63 is disposed so as to be inclined to the surface of the platform 67. The surface of the platform 67 extends perpendicular to the optical axes of the cameras 31, 32 of the vision sensor 30. By processing the images captured by the cameras 31, 32 of the vision sensor 30, as indicated by arrows 102, 103, the distance information of points of measurement set on the surface of the workpiece 63 can be detected.

Figure 8:
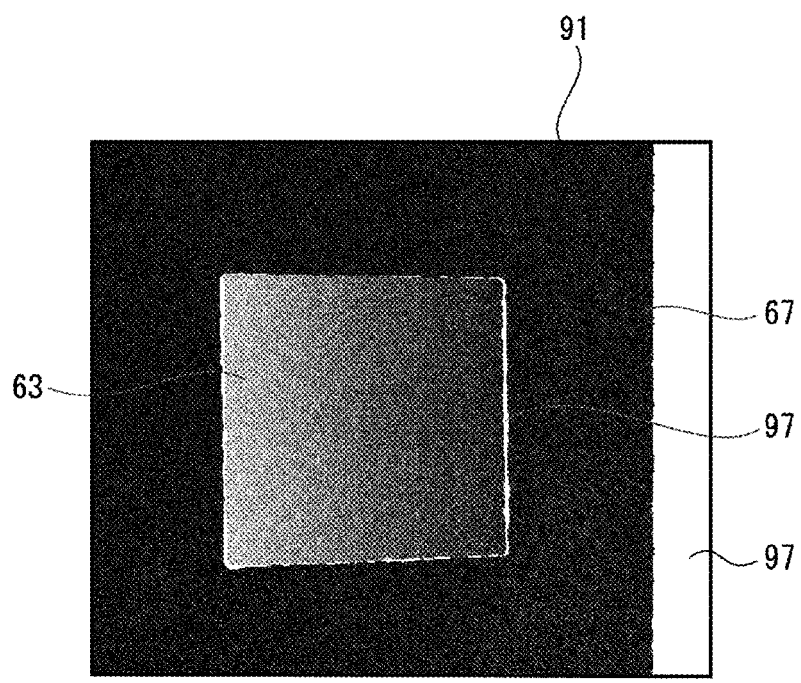
FIG. 8 is an example of a distance image obtained by capturing the workpiece.

FIG. 8 illustrates a distance image obtained by the vision sensor of FIG. 7. With reference to FIG. 7 and FIG. 8, in the example here, a distance image 91 is generated such that the farther the distance from the vision sensor 30 is, the deeper the color is. The workpiece 63 has the surface decreasing in the color toward the vision sensor 30. Since the surface of the platform 67 is at a distant position, the deepest color is set to the pixels.

In the region corresponding to the outer edge of the workpiece 63, information indicating the invalid pixels is set as the distance information of the pixels. An invalid pixel region 97 is formed by the invalid pixels. In the example here, the distance image 91 is generated such that the invalid pixels become colorless. Additionally, the invalid pixel region 97 is also formed in the region outside the platform 67.

In the block matching performed by the block search unit 53, when the determination value for the score is set to be large, there remain many specific blocks in which the invalid pixels are not set. This results in the increase in the number of pixels including information, such as a specific distance. However, the pixel including information, such as the specific distance, is set also in a portion where reliability of block matching is low, such as a step difference portion or an outer edge of a workpiece. This results in decrease in the reliability of the distance image. For example, a distance image with a disappeared contour may be generated in, for example, the outer edge, the protrusion, the recess, or the step difference portion of the workpiece.

On the other hand, when the determination value for the score is set to be small, unless the values of the plurality of pixels in the selection block are close to the values of the plurality of pixels in the specific block, the selection pixel is set as the invalid pixel. In other words, the portion where the reliability of block matching is low is set as the invalid pixel. The portion, such as the step difference portion or the outer edge of the workpiece, is a portion where the reliability is low, and is set as the invalid pixel. The invalid pixel region is generated by the invalid pixels, and a fine contour, such as the outer edge or the step difference portion of the workpiece, can be detected. However, if the block matching is performed while the determination value for the score is set to be small throughout the entire image, the number of pixels including information, such as the specific distance, decreases. For example, there is a problem of decrease in the number of points of measurement for detecting the position of the surface of the object.

In the first control in the present embodiment, a first determination value regarding the score and a second determination value larger than the first determination value are predetermined. A first distance image is generated by using the first determination value and a second determination image is generated by using the second determination value. The first distance image is equivalent to first position information of the surface, and the second distance image is equivalent to second position information of the surface. The contour of the object is detected in advance based on the image of the first camera as the contour detection sensor. Then, the distance information of the pixel included in the first distance image is employed for the pixel included in the region corresponding to the contour of the object. The distance information of the pixel included in the second distance image is employed for the pixel included in the region other than the region corresponding to the contour. In this way, a synthetic distance image in which the first distance image is synthesized with the second distance image is generated.

Figure 9:
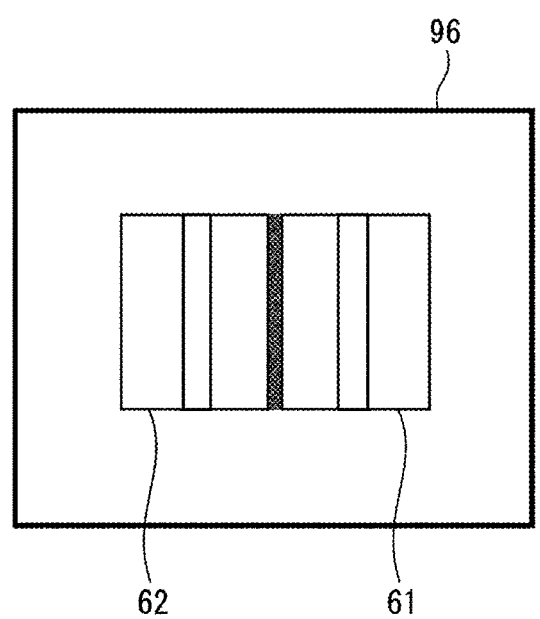
FIG. 9 is a two-dimensional image captured by a first camera in the robot apparatus.

Here, a control that the contour detection unit 52 detects the contours of the workpieces 61, 62 will be described. FIG. 9 illustrates a two-dimensional image captured by the first camera 31 in the robot apparatus 3 of the present embodiment. In the control of detecting the contours of the workpieces 61, 62, a two-dimensional image 96 is captured without using the projector 33. That is, the pattern, such as the stripe pattern, which is generated by the projector 33, is not generated on the surface of the workpiece 61, 62. The image 96 includes the image of the workpiece 61 and the image of the workpiece 62. A slight gap is present between the workpiece 61 and the workpiece 62. The portion of this gap is dark. The contour detection unit 52 in the processing unit 51 detects the contours of the workpieces 61, 62 by using the image 96. More specifically, the contour detection unit 52 detects the positions of the pixels of the contours in the image 96.

The contour detection unit 52 in the present embodiment first performs processing on each of the pixels in the image 96 by using a Sobel filter. The two pixels adjacent to one another are selected from the image processed with the Sobel filter. Then, a luminance gradient between the two pixels is calculated. That is, a contrast of the two pixels is calculated. Then, when the contrast exceeds a predetermined threshold value for contrast, the pixel is determined as the contour of the object.

Figure 10:
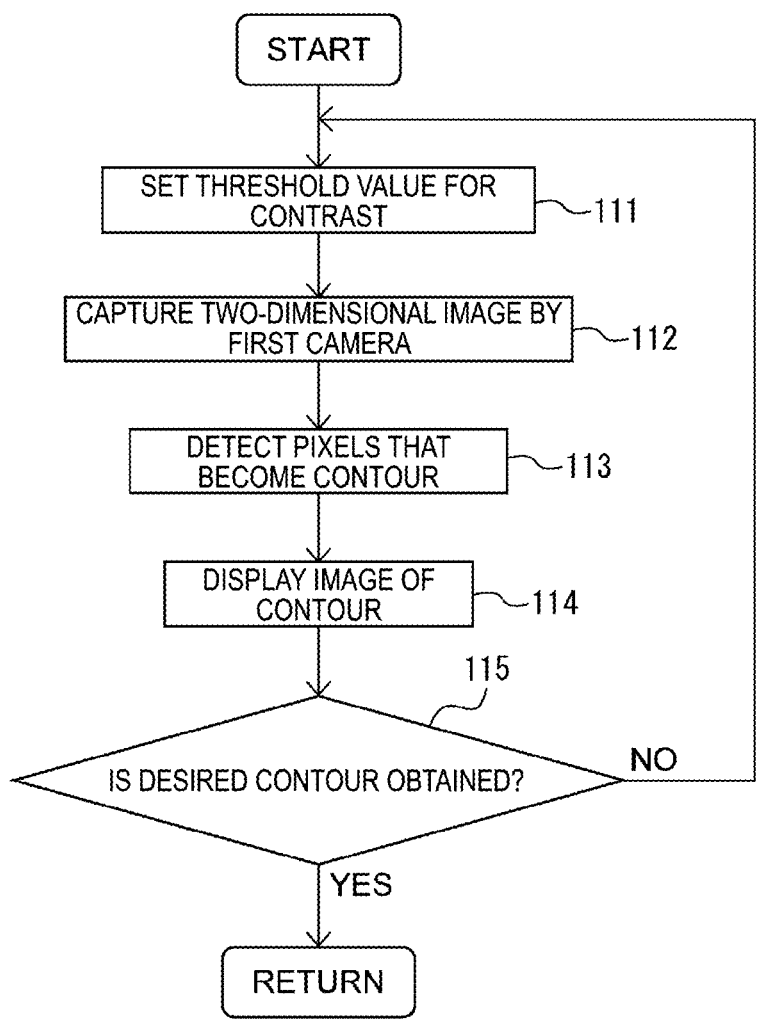
FIG. 10 is a flowchart of a method of setting a threshold value for contrast for detecting a contour from a two-dimensional image.

FIG. 10 illustrates a flowchart of a method of setting the threshold value for contrast for detecting the contour of the object. The operator can set the threshold value for contrast by changing the threshold value for contrast and viewing the actually generated image of the contour.

In step 111, the operator sets the threshold value for contrast to any value. For example, the threshold value for contrast is set based on an empirical rule. Next, in step 112, the operator operates the teach pendant 49 for capturing the two-dimensional image with the first camera 31.

In step 113, the contour detection unit 52 performs processing on the image with the Sobel filter. The contour detection unit 52 detects the pixels that become the contour based on the threshold value for contrast. The contour detection unit 52 generates, for example, an image in which the pixels forming the contour are colored with a color other than black. In step 114, the display part 49b in the teach pendant 49 superimposes the image of contour on the image 96 and displays it. In step 115, the operator views the image of the contour and determines whether the desired contour is included. In step 115, when the desired contour is not obtained, the step returns to step 111.

In step 111, the operator sets a new threshold value for contrast. For example, when the threshold value for contrast is large, unless the luminance gradient at the pixels adjacent to one another is large, the contour is not detected. When a clear contour is not displayed in the image of contour, the operator can reduce the threshold value for contrast. For example, when the contour is not displayed such that the gap between the workpieces 61, 62 is clear, the operator can reduce the threshold value for contrast. In contrast to this, when too many contours come out, the operator can increase the threshold value for contrast. Then, the steps from step 112 to step 115 are repeated.

In step 115, when the desired contour is obtained, the operator can employ the threshold value for contrast at that time. In this way, the operator can set the threshold value for contrast.

Note that the detection of the contour in the two-dimensional image is not limited to this embodiment, and can be performed by any method. For example, the contour may be detected by binarizing the image obtained by the two-dimensional camera.

Figure 11:
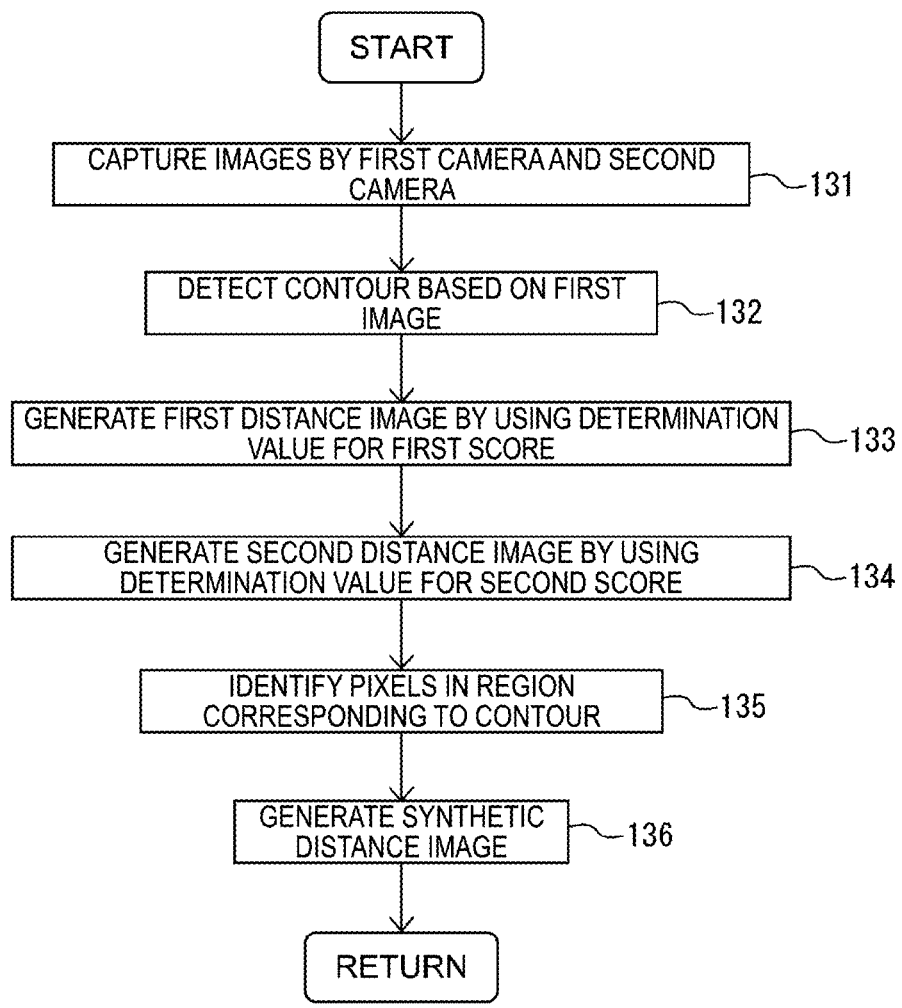
FIG. 11 is a flowchart of a first control in the embodiment.

FIG. 11 illustrates a flowchart of a first control in the present embodiment. With reference to FIG. 2 and FIG. 11, the image capturing control unit 57 in the processing unit 51 captures the first image by the first camera 31 in step 131. The image capturing control unit 57 captures the second image by the second camera 32.

Next, in step 132, the contour detection unit 52 detects the contour of the object by using the first image captured by the first camera 31. In the present embodiment, the contour of the object is detected by using the first image, but the embodiment is not limited to this, and the contour may be detected by using the second image.

In addition, the operator sets a determination value for the first score and a determination value for the second score and stores them in the storage unit 42. The determination value for the second score is set to be larger than the determination value for the first score.

In step 133, the processing unit 51 generates the first distance image by using the predetermined determination value for the first score, the first image, and the second image. More specifically, the block search unit 53 sets the selection block in the first image. The block search unit 53 detects the specific block corresponding to the selection block most in the second image. Here, when the score is at the determination value for the first score or more, the block search unit 53 sets information indicating the invalid pixel as the distance information of the selection pixel in the selection block. The calculation unit 54 calculates the distance information of the pixel corresponding to the point of measurement on the surface of the workpiece for the pixels other than the invalid pixel. The generation unit 55 generates the first distance image by integrating the distance information of the plurality of pixels. In step 134, similar to step 133, the processing unit 51 generates the second distance image by using the determination value for the second score, the first image, and the second image.

In step 135, the synthesis unit 56 sets a region corresponding to the contour based on the contours of the workpieces 61, 62 detected by the contour detection unit 52. More specifically, the synthesis unit 56 acquires the pixels that become the contour, and sets the region corresponding to the contour around the pixels that become the contour. Then, the synthesis unit 56 identifies the pixels included in the regions corresponding to the contours of the workpieces 61, 62 and the pixels included in the region other than the regions corresponding to the contours.

Figure 12:
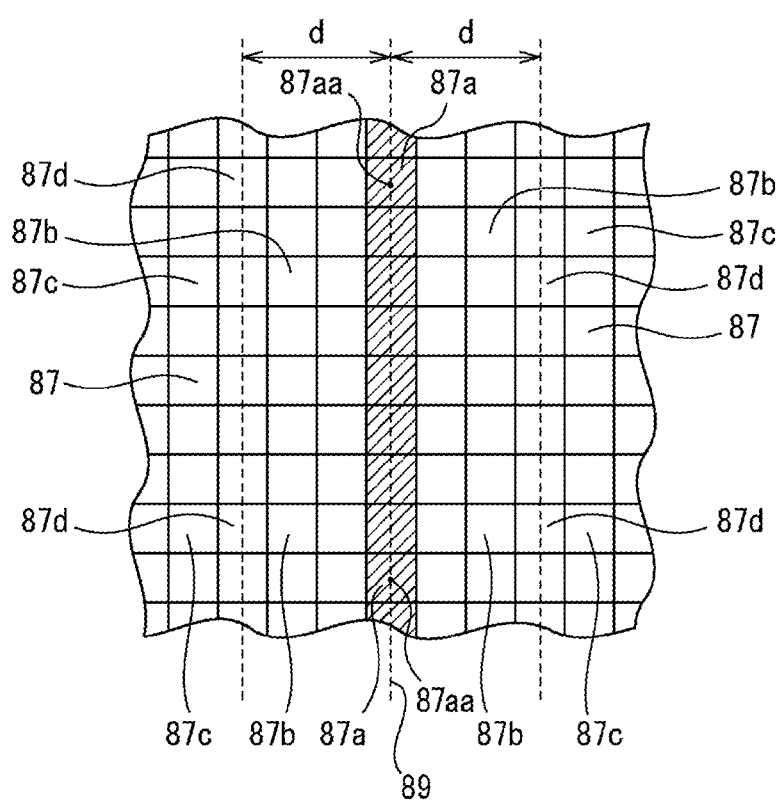
FIG. 12 is an enlarged view of an image that describes a region corresponding to the contour.

FIG. 12 is an enlarged view of an image in which the pixels corresponding to the contour are indicated. The image illustrated in FIG. 12 is an enlarged view of the image captured by the first camera 31, for example. The image includes a plurality of pixels 87. The contour detection unit 52 detects the positions of pixels 87a that become the contour. In the example here, the pixels 87a are linearly aligned. A line 89 passing through a center point 87aa, which is a center of gravity of the shape of the pixel 87a, is equivalent to the contour line of the object. The synthesis unit 56 sets a region of widths d with respect to the line 89 as the region corresponding to the contour. The operator can preset the widths d. For example, the length of several pixels can be set as the width d.

The synthesis unit 56 identifies pixels 87b included in the region corresponding to the contour, and pixels 87c included in the region other than the region corresponding to the contour. At this time, a pixel 87*d* that is partially disposed in the region corresponding to the contour can be determined to be disposed in the region corresponding to the contour. Alternatively, the pixel 87*d* that is partially disposed in the region corresponding to the contour may be determined to be disposed in the region other than the region corresponding to the contour.

In the example illustrated in FIG. 12, the pixels 87 that become the contour are linearly aligned along the direction in which the plurality of pixels 87 are aligned, but the embodiment is not limited to this. The pixels that become the contour are aligned in a direction inclined with respect to the direction in which the plurality of pixels are aligned in some cases. Alternatively, the pixels that become the contour are aligned in a curved shape in some cases. In such a case as well, the region corresponding to the contour can be set by any method based on pixels that become the contour. For example, a straight line connecting the center points of the pixels that become the contour and are adjacent to one another is calculated. Then, the region of the width d is set in a direction perpendicular to the straight line connecting the center points. By performing this control on the respective pixels that become the contour, the region corresponding to the contour can be set. Alternatively, the region of the width d is set from the center points of the respective pixels that become the contour in a predetermined direction. Furthermore, the region of the width d is set from the center points in the direction perpendicular to the predetermined direction. By performing this control on the respective pixels that become the contour, the region corresponding to the contour can be set.

With reference to FIG. 11, in step 136, the synthesis unit 56 generates the synthetic distance image based on the first distance image, the second distance image, and the region corresponding to the contour.

Figure 13:
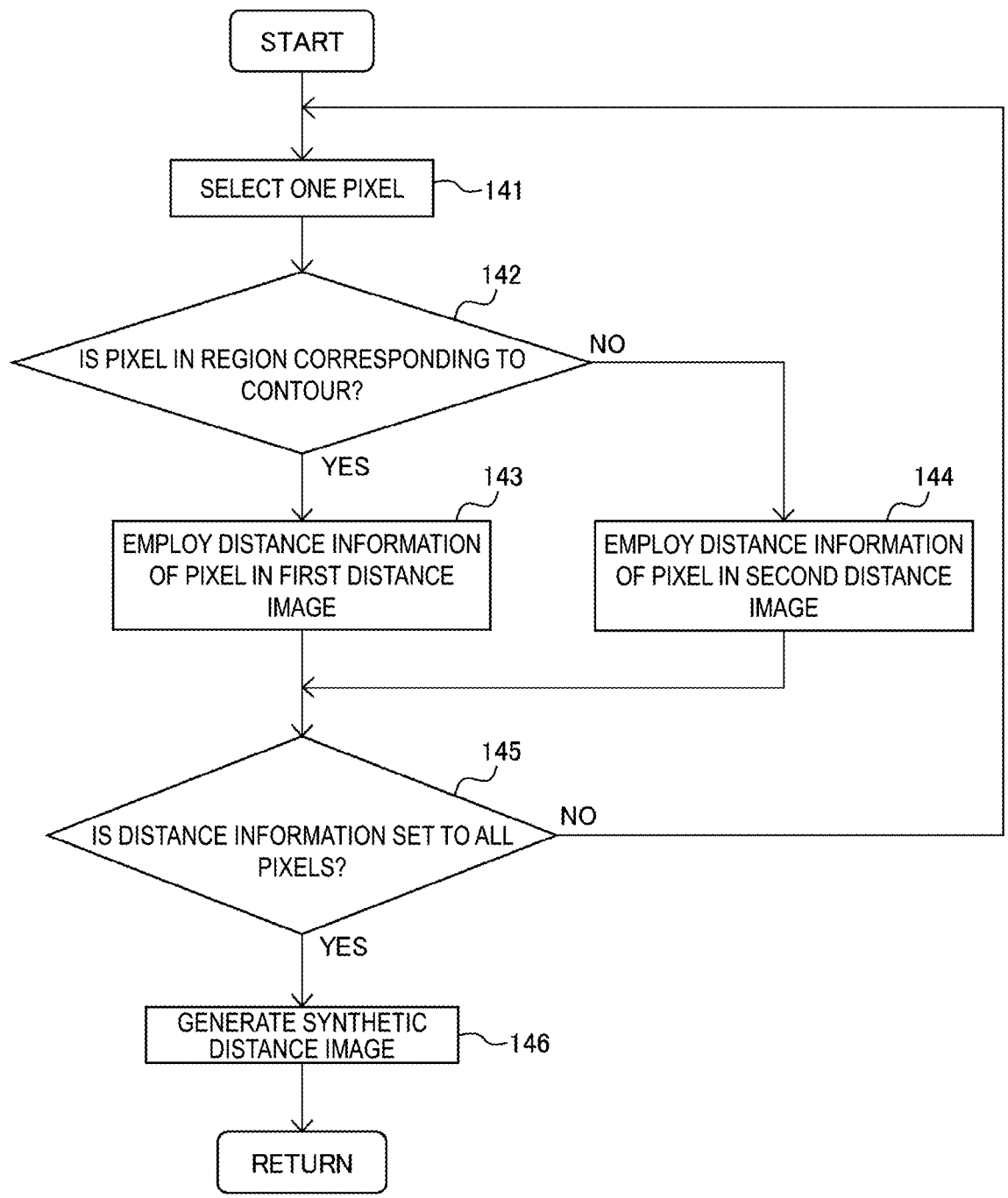
FIG. 13 is a flowchart of a control that generates a synthetic distance image.

FIG. 13 illustrates a flowchart of a control that generates the synthetic distance image by the synthesis unit. In step 141, the synthesis unit 56 selects one pixel included in the first image captured by the first camera 31, for example. In step 142, the synthesis unit 56 determines whether one pixel is disposed inside the region corresponding to the contour. In step 142, when one pixel is disposed inside the region corresponding to the contour, the control transitions to step 143.

In step 143, the synthesis unit 56 employs the distance information of the pixel included in the first distance image for the pixel included in the region corresponding to the contour. That is, the synthesis unit 56 detects the pixel corresponding to one pixel in the first distance image. The synthesis unit 56 sets the distance information of one pixel to the distance information of the pixel in the first distance image. When the information shows that the distance information of the pixel in the first distance image is the invalid pixel, one pixel is set as the invalid pixel.

In step 142, when one pixel is disposed outside the region corresponding to the contour, the control transitions to step 144. In step 144, the synthesis unit 56 employs the distance information of the pixels in the second distance image for the pixels disposed in the region other than the region corresponding to the contour. When the information shows that the distance information of the pixel in the second distance image is the invalid pixel, one pixel is set as the invalid pixel.

Next, in step 145, the synthesis unit 56 determines whether the distance information has been set to all pixels. When the distance information is not set to at least one pixel in step 145, the control transitions to step 141. Then, another pixel is selected in step 141, and the control from step 142 to step 145 is repeated. In this way, the distance information is set to all pixels.

In step 145, when the distance information is set to all pixels, the control transitions to step 146. In step 146, the synthesis unit 56 generates the synthetic distance image formed by integrating the distance information of the respective pixels.

Figure 14:
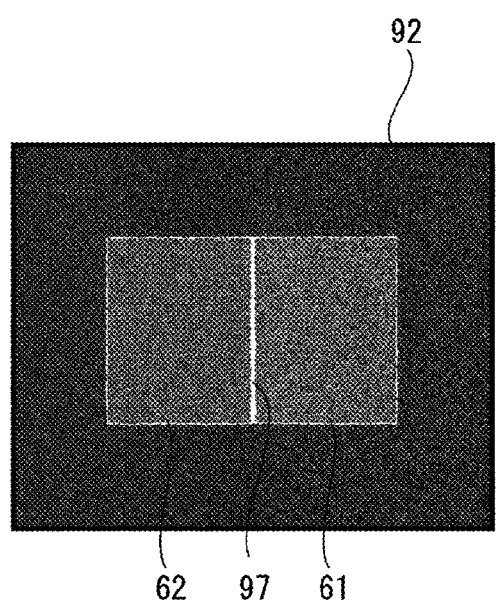
FIG. 14 is a distance image generated in the first control.

FIG. 14 illustrates an example of the synthetic distance image generated in the first control. In a distance image 92, the distance information of the pixels is expressed by depth of color. Further, the invalid pixels are colorless. The invalid pixel region 97 formed by the invalid pixels is generated in a gap present between the workpiece 61 and the workpiece 62. Additionally, in regions other than the edge portion of the upper surface of each workpiece 61, 62, there are the small number of invalid pixels, and the distance information of each of the pixels includes information of the specific distance or position. In other words, many points of measurement are detected in the regions other than the edge portions of the upper surfaces of the workpieces 61, 62.

Figure 15:
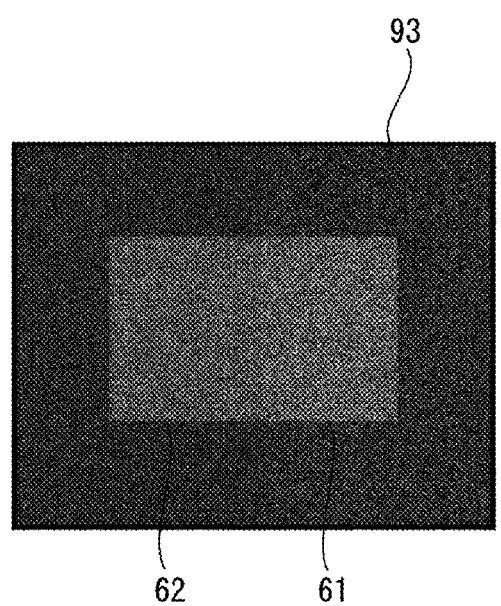
FIG. 15 is a distance image generated in a control of a comparative example.

FIG. 15 illustrates an example of a distance image of a comparative example. In a distance image 93 of the comparative example, a determination value for a score when block matching is performed is set to be large to all pixels. For example, the distance image 93 is a second distance image generated by using a determination value for the second score. In this example, the distance information including information of the specific distance or position is set to many pixels. That is, many points of measurement are detected. However, in the gap present between the workpiece 61 and the workpiece 62 as well, the distance information including the information of the specific distance or position is set. Thus, the gap present between the workpiece 61 and the workpiece 62 disappears in the distance image 93. As described above, the reliability of distance information of the pixels is low in the portions, such as the outer edges of the workpieces 61, 62.

In contrast to this, with reference to FIG. 14, in the first control of the present embodiment, since the determination value for the score is set small in the region corresponding to the contour, the invalid pixel region 97 constituted of the invalid pixels develops in the region corresponding to the outer edges of the workpieces 61, 62. The gap between the first workpiece 61 and the second workpiece 62 is clearly represented. In this way, the first workpiece 61 and the second workpiece 62 can be clearly separated.

The operation command unit 58 in the processing unit 51 can detect that the two workpieces 61, 62 are present. Additionally, many points of measurement are detected in the region away from the outer edges of the upper surfaces of the respective workpieces 61, 62. This allows the operation command unit 58 to drive the robot 1 based on the distance information of many points of measurement. For example, the operation command unit 58 can drive the robot 1 such that the hand 5 is disposed at the position of the center of gravity on the upper surface of the workpiece 61.

In this manner, in the first control, whether each pixel is included in the region corresponding to the contour is determined, and the distance information of the pixel in the first distance image or the distance information of the pixel in the second distance image is set to each pixel. Thus, in the region where the contour is present, the distance image in which the further fine shape is clear can be obtained with the invalid pixels. On the other hand, in the region other than the region where the contour is present, since the distance information in the distance image using the large determination value for the score is employed, many points of measurement can be obtained. The three-dimensional measurement device with the improved accuracy of the position information of the surface of the object can be provided.

A setting method of the determination value for the first score in the present embodiment will be described in FIG. 16. The operator can set the determination value for the first score and the determination value for the second score while viewing the actually generated distance image. For example, the operator can set the determination values for the scores by generating the distance image of the workpiece on which the actual operation is performed.

In step 121, the operator sets the determination value for the first score. For example, the operator sets any determination value for the first score based on the empirical rule. In step 122, the operator operates the teach pendant 49 for capturing the images by the first camera 31 and the second camera 32.

In step 123, the processing unit 51 generates the distance image based on the determination value for the first score, the first image, and the second image. In step 124, the display part 49b in the teach pendant 49 displays the distance image. For example, the distance image as illustrated in FIG. 15 is displayed.

In step 125, the operator determines whether the desired distance image is obtained. Here, in order to set the determination value for the first score, whether the invalid pixel region 97 is formed between the workpieces 61, 62 is determined. The excessively large determination value for the score reduces the invalid pixel regions 97 or makes the invalid pixel regions 97 disappear. On the other hand, the excessively small determination value for the score generates the many invalid pixel regions 97 also in the region other than the region of the outer edge of the workpiece 61, 62. This results in a decrease in the number of pixels including information, such as the specific distances, corresponding to the surfaces of the workpieces 61, 62. That is, the number of points of measurement set on the upper surfaces of the workpieces 61, 62 decreases.

In step 125, when the desired distance image is not obtained, the step returns to step 121. Then, the operator sets another determination value for the first score. The operator views the distance image and changes the determination value for the first score such that the invalid pixel regions 97 are generated in the contours, such as the outer edges and the step difference portions of the workpieces. For example, when the invalid pixel regions 97 are not generated between the workpieces 61, 62, the operator sets the small determination value for the first score. When many invalid pixel regions 97 are formed, the operator sets the large determination value for the first score. Then, the operator repeats the steps from step 122 to step 125. When the desired distance image is generated in step 125, the determination value for the first score at that time can be employed.

Figure 16:
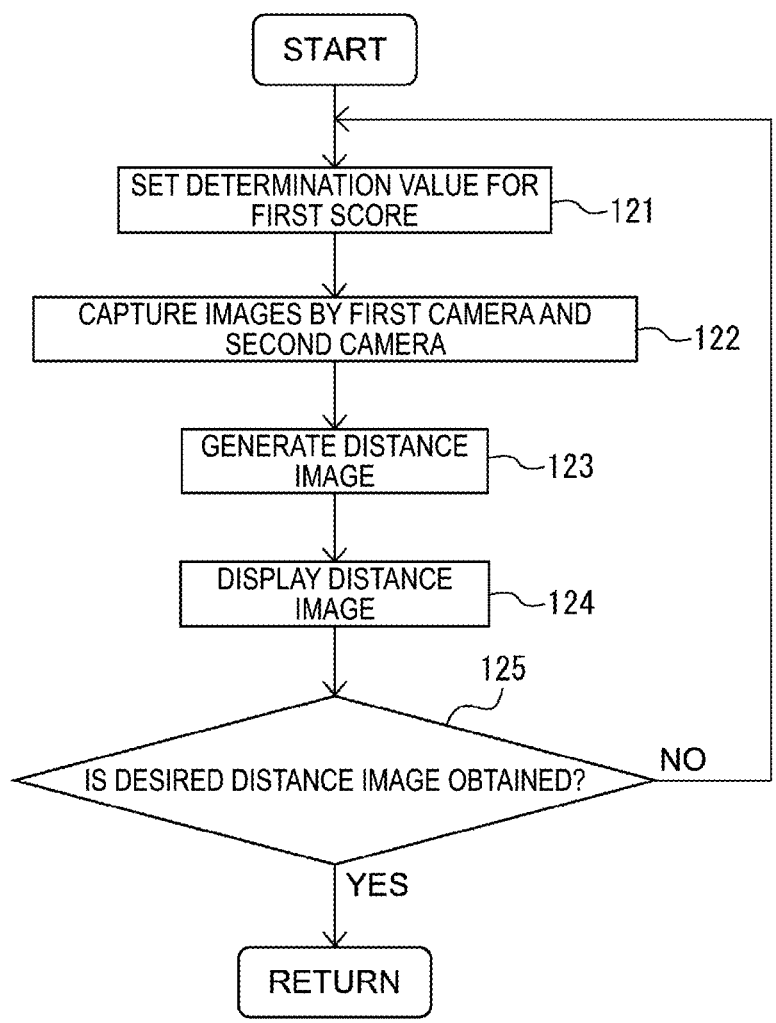
FIG. 16 is a flowchart of a method of setting a determination value for a first score.

The determination value for the second score can also be set in the method similar to FIG. 16. In step 125, the operator determines whether there are many pixels, to which the information, such as the specific distance, is set, present in the regions corresponding to the upper surfaces of the workpieces 61, 62 in the distance image. In the distance image generated with the determination value for the second score, the invalid pixel regions need not develop between the workpieces 61, 62. The determination value for the second score is set to be larger than the determination value for the first score. The processing unit 51 can generate the synthetic distance image by using the first score and the second score thus set.

Next, the second control in the present embodiment will be described. In the second control, instead of changing the determination values for the scores and capturing a plurality of the distance images, the block size is changed and a plurality of distance images are captured. Then, the plurality of distance images formed so as to have the block sizes different from one another are synthesized, thus generating the synthetic distance image.

With reference to FIG. 4 and FIG. 5, when the block sizes are increased such that the selection block 81 and the search block 83 include many pixels when block matching is performed, since the differences between many pixels are integrated, the accuracy of calculating the parallax decreases. In addition, in a case where the block sizes are reduced, there may be a case where performing the block matching is difficult in a region where the pixel values gradually change. For example, there may be a case where many search blocks having the same score are detected.

In the second control, the operator defines a first selection block and a second selection block including pixels more than those of the first selection block in advance. That is, the operator defines the selection blocks different from one another in the block size. The first selection block has the block size smaller than that of the second selection block. For example, as the first selection block, a block formed of three rows and three columns can be employed. Also, as the second selection block, a block formed of nine rows and nine columns can be employed.

Figure 17:
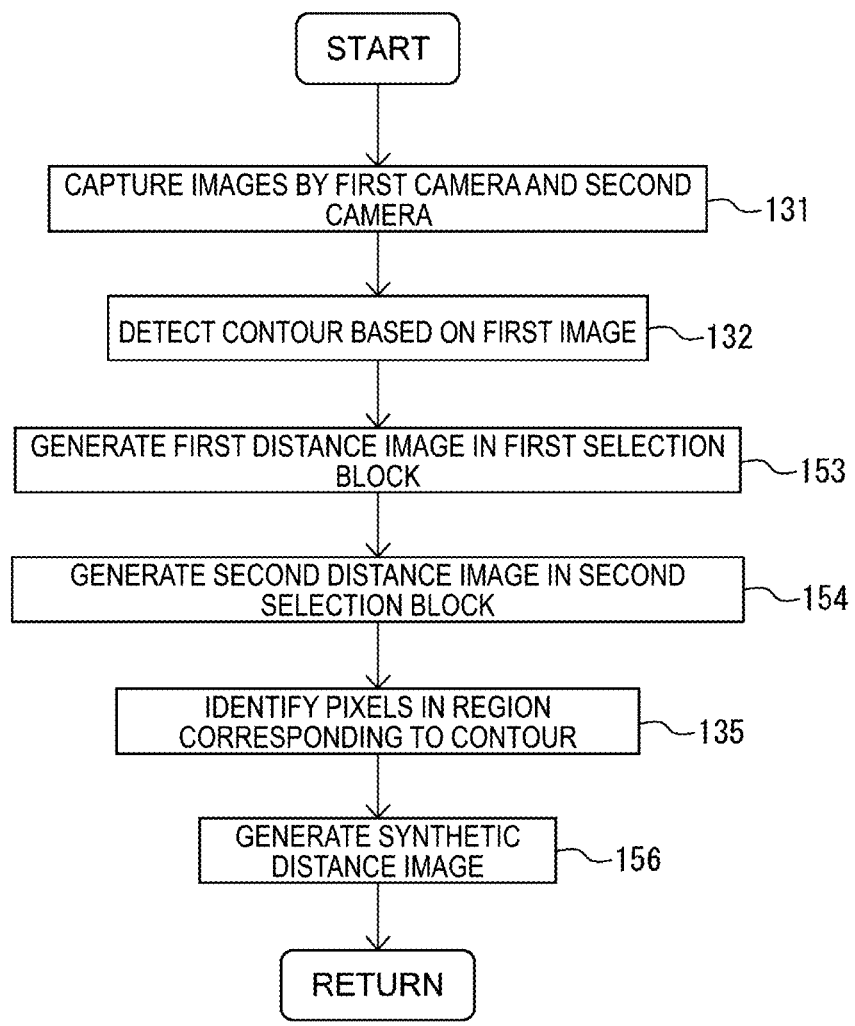
FIG. 17 is a flowchart of a second control in the embodiment.

FIG. 17 illustrates a flowchart of the second control. With reference to FIG. 2 and FIG. 17, step 131 and step 132 are similar to those of the control in the first control (see FIG. 11). In step 153, the block search unit 53, the calculation unit 54, and the generation unit 55 generate the first distance image by using the first image, the second image, and the first selection block. The block search unit 53 performs the control of block matching by using the first selection block and the search block having the block size same as that of the first selection block.

In step 154, the block search unit 53, the calculation unit 54, and the generation unit 55 generate the second distance image by using the first image, the second image, and the second selection block. The block search unit 53 performs the control of block matching by using the second selection block and the search block having the block size same as that of the second selection block.

Next, in step 135, similar to the first control, the synthesis unit 56 acquires the pixels that become the contours of the workpieces 61, 62 detected by the contour detection unit 52. The synthesis unit 56 sets the region corresponding to the contour based on the pixels that become the contour. The synthesis unit 56 identifies pixels included in the region corresponding to the contour and the pixels included in the region other than the region corresponding to the contour (see FIG. 11 and FIG. 12).

In step 156, the synthesis unit 56 generates the synthetic distance image. The synthesis unit 56 sets, to the pixel included in the region corresponding to the contour, the distance information of the pixel included in the first distance image generated by the first selection block. On the other hand, the distance information of the pixel included in the second distance image generated by the second selection block is set to the pixel included in the region other than the region corresponding to the contour. In this manner, the synthetic distance image can be generated by setting, to each of the pixels, the distance information of the pixel included in the first distance image or the distance information of the pixel included in the second distance image.

Figure 18:
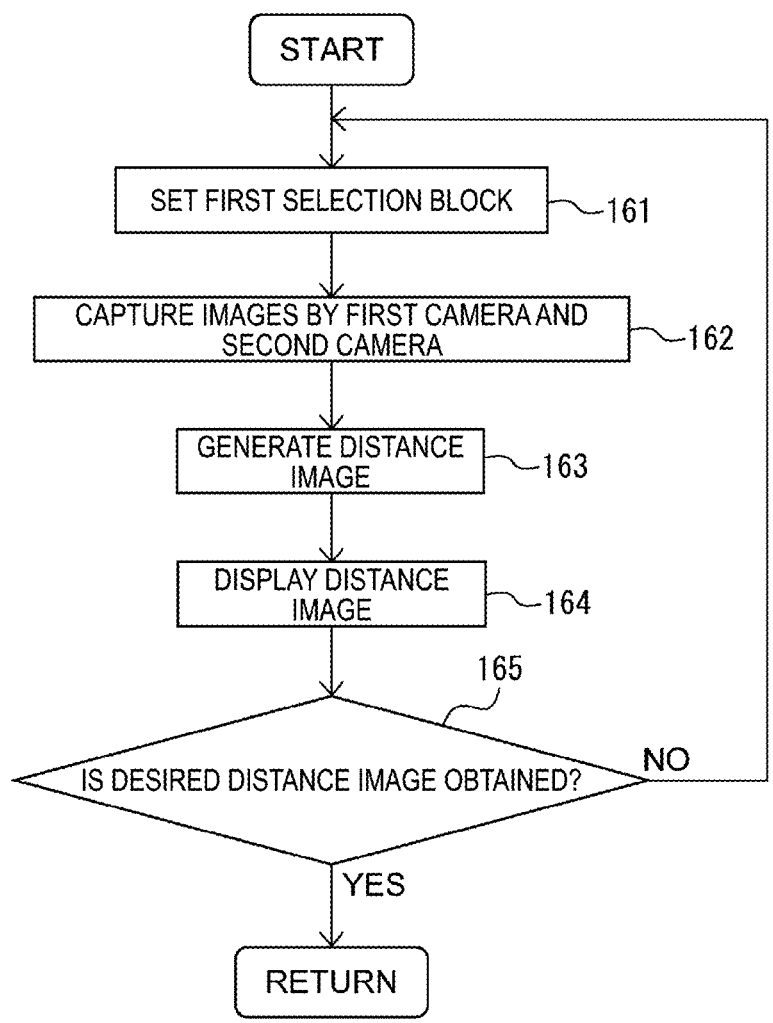
FIG. 18 is a flowchart of a method of setting a block size of a first selection block.

FIG. 18 illustrates a flowchart of a method of setting the block size of the first selection block. The operator can set the block size of the first selection block while viewing the actually generated distance image. In step 161, the operator sets the first selection block. The operator sets the first selection block at any block size based on, for example, the experience. In step 162, the operator operates the teach pendant 49 for capturing the images by the first camera 31 and the second camera 32. In step 163, the processing unit 51 generates the distance image by using the first selection block. The display part 49b in the teach pendant 49 displays the distance image.

In step 165, the operator determines whether the desired distance image is obtained. In the first distance image generated by the first selection block, the contour, such as the outer edge or the step difference portion of the workpiece, is preferably displayed clearly. For example, the increase in block size blurs the contours of the workpieces 61, 62. Additionally, the gap between the workpieces 61, 62 possibly disappears. On the other hand, the excessively small block size possibly detects the contour other than the desired contour.

In step 165, when the desired distance image is not obtained, the step transitions to step 161. In step 161, the operator sets the first selection block whose block size has been changed. For example, when the gap between the workpieces 61, 62 is unclear, the first selection block with the reduced block size can be set. Then, the operator repeats from step 162 to step 165. In step 165, when the desired distance image is obtained, the first selection block having the block size at that time can be employed.

The block size of the second selection block can also be set by the method similar to that of FIG. 18. For example, the operator can set the block size of the second selection block such that the contour of the gap between the workpieces 61, 62 becomes unclear in steps 161, 165.

Figure 19:
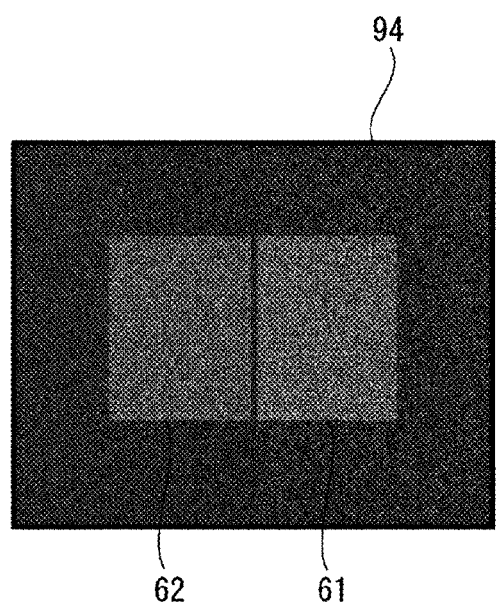
FIG. 19 is the distance image generated in the second control.

FIG. 19 illustrates the distance image captured in the second control. In the regions where the outer edges of the workpieces 61, 62 are present, the distance information of the pixels included in the first distance image generated by the first selection block having the small block size is employed. For example, in the region where the gap between the workpiece 61 and the workpiece 62 is present, the distance information of the pixels of the first distance image is employed. Thus, in a distance image 94, the outer edge of the workpiece 61 and the outer edge of the workpiece 62 are clearly shown. In particular, the gap between the workpiece 61 and the workpiece 62 is clearly shown by the difference in depth of the pixels.

On the other hand, in the region other than the contour of the workpiece 61, 62, the distance information of the pixels in the second distance image generated at the second block size having the large block size is employed. At the center portion of the upper surfaces of the workpieces 61, 62, the distance information of the pixels in the second distance image is employed. Thus, many points of measurement where the distance information is accurate are set. Also, the accurate position information of the surfaces of the workpieces 61, 62 can be detected even in a region in which the gradient of the pixel values, such as luminance or a density, in the two-dimensional image is small.

The other controls are similar to those of the first control, and thus description of those will not be repeated here.

The vision sensor 30 of the present embodiment is fixed to the support member 66, but the embodiment is not limited to this. The vision sensor can be disposed such that the image of the workpiece can be captured. For example, the vision sensor may be fixed to the wrist so as to move integrally with the wrist of the robot. In this case, the position of the camera coordinate system in the robot can be calculated in advance. Then, the position information of the surface of the object generated at the camera coordinate system can be converted into the world coordinate system based on the position and the orientation of the robot.

The vision sensor 30 of the present embodiment includes the two two-dimensional cameras, but the embodiment is not limited to this. The vision sensor may include three or more two-dimensional cameras. With this configuration where the three-dimensional sensor includes the three or more cameras, even when a part of the image is unclear due to, for example, halation, the position information of the surface of the object can be generated based on images captured by the other cameras. Further, the vision sensor according to the present embodiment includes the projector, but the embodiment is not limited to this. The vision sensor need not include the projector.

In the present embodiment, the controller that controls the robot functions as the processing unit for processing the image of the vision sensor, but the embodiment is not limited to this. The processing unit may be configured by an arithmetic processing device (a computer) different from the controller that controls the robot. For example, a tablet terminal functioning as a processing unit may be connected to the controller that controls the robot.

The three-dimensional measurement device of the present embodiment is disposed in a robot apparatus, but the embodiment is not limited to this. The three-dimensional measurement device can be disposed in any apparatus.

In each control described above, the order of the steps can be changed as appropriate as long as the function and the effect are not changed.

The above embodiment can be modified as appropriate. In each of the above-described drawings, the same or equivalent parts are denoted by the same reference numerals. It should be noted that the above-described embodiment is an example and does not limit the invention. In addition, the embodiment includes modifications of the embodiment described in the claims.

REFERENCE SIGNS LIST 2 controller
23 position detector
30 vision sensor
31 first camera
32 second camera
51 processing unit
52 contour detection unit
53 block search unit
54 calculation unit
55 generation unit
56 synthesis unit
61, 62, 63 workpiece
77 first image
78 second image
81 selection block
82 specific block
85, 86, 87 pixel
85a selection pixel
87a, 87b, 87c pixel 91, 92, 93, 94 distance image
96 image
97 invalid pixel region

The invention claimed is:

1. A three-dimensional measurement device, comprising:
a vision sensor that includes a first camera configured to capture a first image and a second camera configured to capture a second image;
a contour detection sensor configured to detect a contour of an object; and
a processor configured to detect position information of a surface of the object based on the first image and the second image, wherein the processor is configured to:
detect the contour of the object based on an output from the contour detection sensor;
set a selection block formed of a plurality of pixels including one selection pixel selected in the first image and search for a specific block corresponding to the selection block in the second image;
calculate distance information of a pixel based on parallax between a position of the selection pixel in the selection block and a position of a specific pixel corresponding to the selection pixel in the specific block;
generate the position information of the surface of the object including the distance information of a plurality of the pixels; and
synthesize the position information of the surface of the object generated under conditions different from one another,
the processor is configured to
calculate an integrated value by integrating magnitudes of differences between values of pixels included in the selection block and values of pixels included in the specific block or square values of the differences,
determine that the pixel included in the specific block corresponds to the pixel included in the selection block when the integrated value is less than a predetermined determination value, and
set information indicating an invalid pixel as distance information of the selection pixel when the integrated value exceeds the predetermined determination value or the specific block corresponding to the selection block is not detected,
a first determination value regarding the integrated value and a second determination value regarding the integrated value larger than the first determination value are predetermined,
the processor is configured to generate
first position information of the surface by using the first image, the second image, and the first determination value, and
second position information of the surface by using the first image, the second image, and the second determination value, and
the processor is configured to set a region corresponding to the contour based on the detected contour, employ distance information of a pixel included in the first position information of the surface for a pixel included in the region corresponding to the contour, employ distance information of a pixel included in the second position information of the surface for a pixel included in a region other than the region corresponding to the contour, and thereby generate position information of a surface obtained by synthesizing the first position information of the surface and the second position information of the surface.

2. A three-dimensional measurement device, comprising:
a vision sensor that includes a first camera configured to capture a first image and a second camera configured to capture a second image;
a contour detection sensor configured to detect a contour of an object; and
a processor configured to detect position information of a surface of the object based on the first image and the second image, wherein
the processor is configured to:
detect the contour of the object based on an output from the contour detection sensor;
set a selection block formed of a plurality of pixels including one selection pixel selected in the first image and search for a specific block corresponding to the selection block in the second image;
generate distance information of a pixel based on parallax between a position of the selection pixel in the selection block and a position of a specific pixel corresponding to the selection pixel in the specific block;
generate the position information of the surface of the object including the distance information of a plurality of the pixels; and
synthesize the position information of the surface of the object generated under conditions different from one another,
a first selection block and a second selection block including pixels more than pixels of the first selection block are predetermined,
the processor is configured to generate
first position information of the surface by using the first image, the second image, and the first selection block, and
second position information of the surface by using the first image, the second image, and the second selection block, and
the processor is configured to set a region corresponding to the contour based on the detected contour, set distance information of a pixel included in the first position information of the surface for a pixel included in the region corresponding to the contour, set distance information of a pixel included in the second position information of the surface for a pixel included in a region other than the region corresponding to the contour, and thereby generate position information of a surface obtained by synthesizing the first position information of the surface and the second position information of the surface, and
the processor is configured to set, as the region corresponding to the contour, a region having a predetermined width with respect to a line passing through a center of gravity of a shape of each pixel forming the contour.

3. The three-dimensional measurement device according to claim 1, wherein the contour detection sensor is the first camera or the second camera.

* * * * *